US012526573B2

(12) United States Patent
Konishi et al.

(10) Patent No.: US 12,526,573 B2
(45) Date of Patent: Jan. 13, 2026

(54) DIFFUSER AND SPEAKER UNIT INCLUDING DIFFUSER

(71) Applicant: KABUSHIKI KAISHA KAWAI GAKKI SEISAKUSHO, Hamamatsu (JP)

(72) Inventors: Kazuki Konishi, Hamamatsu (JP); Yoshinori Nakanishi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 140 days.

(21) Appl. No.: 18/618,764

(22) Filed: Mar. 27, 2024

(65) Prior Publication Data

US 2024/0334119 A1 Oct. 3, 2024

(30) Foreign Application Priority Data

Mar. 31, 2023 (JP) ................................ 2023-057105

(51) Int. Cl.
*H04R 1/34* (2006.01)
*H04R 1/02* (2006.01)

(52) U.S. Cl.
CPC ............ *H04R 1/345* (2013.01); *H04R 1/025* (2013.01)

(58) Field of Classification Search
CPC ................................ H04R 1/345; H04R 1/025
USPC ........................................................ 381/339
See application file for complete search history.

(56) References Cited

U.S. PATENT DOCUMENTS

| | | | | |
|---|---|---|---|---|
| 10,237,636 | B1 * | 3/2019 | Ivey | H04R 1/025 |
| 2007/0064958 | A1 * | 3/2007 | Nakamura | H04R 1/345 381/71.7 |
| 2020/0236462 | A1 | 7/2020 | Kitagawa et al. | |
| 2020/0322717 | A1 * | 10/2020 | Negishi | H04R 1/345 |
| 2022/0303672 | A1 * | 9/2022 | Ioku | H04R 1/345 |
| 2024/0323597 | A1 * | 9/2024 | Ioku | G10H 1/34 |

FOREIGN PATENT DOCUMENTS

| | | |
|---|---|---|
| JP | 2020-178336 A | 10/2020 |

* cited by examiner

*Primary Examiner* — Sean H Nguyen
(74) *Attorney, Agent, or Firm* — Womble Bond Dickinson (US) LLP

(57) ABSTRACT

A diffuser capable of evenly and widely diffusing sound emitted from a speaker, thereby making it possible to obtain excellent acoustic radiation characteristics. The diffuser includes a base portion formed into a plate shape and including a through hole having approximately the same shape and size as a diaphragm of the speaker, a center reflection portion formed into a predetermined size corresponding to the through hole and supported by the base portion, and an edge reflection portion that is formed into an arcuate shape protruding at least either forward or rearward of the base portion from a peripheral edge of the through hole of the base portion and having a recessed inner surface, for further reflecting sound reflected from the center reflection portion.

6 Claims, 9 Drawing Sheets

DIFFUSER AND SPEAKER UNIT INCLUDING DIFFUSER

CROSS-REFERENCE TO RELATED APPLICATIONS

This application claims priority to Japanese Patent Application Number 2023-057105, filed on Mar. 31, 2023, the entire content of each of which is incorporated herein by reference.

BACKGROUND OF THE INVENTION

Field of the Invention

The present invention relates to a diffuser, which is disposed forward of a diaphragm of a speaker, for diffusing sound emitted from the speaker, and a speaker unit including the diffuser.

Description of the Related Art

Conventionally, as this type of diffuser, there has been known, for example, one disclosed in Japanese Laid-Open Patent Publication (Kokai) No. 2020-178336. The disclosed diffuser includes a first reflection member which has a through opening of a predetermined size in a central portion thereof, and a second reflection member which is disposed such that the second reflection member faces a speaker via the opening. Between the first reflection member of the diffuser and a diaphragm of the speaker disposed on a rear surface side of the first reflection member, there is formed a first acoustic passage, whereas between the first reflection member and the second reflection member, there is formed a second acoustic passage.

When the diaphragm of the speaker vibrates, causing emission of sound forward of the diaphragm, sound reflected from a surface of the first reflection member on a side toward the speaker is diffused in a radial direction of the diffuser via the first acoustic passage. Further, out of the sound emitted from the speaker, part which has passed through the opening formed in the center of the first reflection member is reflected from the second reflection member and is diffused in the radial direction and forward of the diffuser via the second acoustic passage.

In the above-described conventional diffuser, sound emitted from the speaker is diffused in the radial direction and forward of the diffuser via the first acoustic passage and the second acoustic passage separated by the first reflection member. However, when sound waves having passed the two acoustic passages, respectively, are combined in the radial direction and forward of the diffuser, a displacement occurs depending on a pitch range, which consequently sometimes causes bias or unevenness of the strength of sound and the degree of diffusion of the sound.

Further, for a speaker unit having a speaker disposed on a rear surface side of a baffle board formed with a sound emission hole, if such a diffuser as described above is provided inside the sound emission hole of the baffle board, the following problem occurs: Sound emitted from the speaker and having passed the first acoustic passage or the second acoustic passage is sometimes directly reflected on an inner peripheral surface of the sound emission hole of the baffle board. In this case, the sound reflected on the inner peripheral surface of the sound emission hole of the baffle board is sometimes reflected in an unintended direction or in some cases reflected such that the sound returns toward the speaker.

SUMMARY OF THE INVENTION

It is an object of the present invention to provide a diffuser which is capable of evenly and widely diffusing sound emitted from a speaker, thereby making it possible to obtain excellent acoustic radiation characteristics, and a speaker unit including the diffuser.

To attain the above object, in a first aspect of the present invention, there is provided a diffuser disposed forward of a diaphragm of a speaker, for reflecting sound emitted from the speaker and thereby diffusing the sound, including a base portion that is formed into a plate shape having a predetermined planar shape in plan view, and includes a through hole having approximately the same shape and size as the diaphragm of the speaker, a center reflection portion that is formed into a predetermined size corresponding to the through hole and is supported by the base portion, and an edge reflection portion that is formed into an arcuate shape protruding at least either forward or rearward of the base portion from a peripheral edge of the through hole of the base portion and having a recessed inner surface, for further reflecting sound reflected from the center reflection portion.

According to the construction of the first aspect of the present invention, the diffuser disposed forward of the diaphragm of the speaker includes the above-described base portion, center reflection portion, and edge reflection portion. When sound is emitted from the diaphragm of the speaker, the sound is reflected on the center reflection portion, proceeds in a radial direction of the center reflection portion, and is further reflected on the edge reflection portion. Since this edge reflection portion is formed into the arcuate shape protruding at least either forward or rearward of the base portion from the peripheral edge of the through hole of the base portion and having the recessed inner surface, the sound reflected on the edge reflection portion is widely diffused through space ranging from forward of the diffuser to a side opposite to reflecting portions with respect to an axis passing through the center of the diffuser, thus being increased in the degree of diffusion thereof. This makes it possible to obtain the diffuser that is capable of evenly and widely diffusing sound emitted from the speaker.

Preferably, the center reflection portion is formed into a hollow shape open forward of the base portion and has an opening in a central portion thereof, which extends through the center reflection portion and has a predetermined diameter.

According to the construction of this preferred embodiment, the center reflection portion is formed into the hollow shape open forward of the base portion, and the opening extending through the center reflection portion and having the predetermined diameter is formed in the center of the center reflection portion. Therefore, sound passing through the opening can be directly emitted forward of the diffuser, whereby it is possible to suppress reduction of sound pressure.

More preferably, the center reflection portion further includes a plurality of boards which each have a predetermined height protruding forward of the base portion and extend parallel to each other such that each traverses the opening.

According to the construction of this preferred embodiment, the plurality of boards each having a predetermined height protruding forward of the base portion are provided such that the boards extend parallel to each other and traverse the opening. With this, sound passing through the opening can be prevented from being reduced in sound pressure of a specific frequency.

Further preferably, the plurality of boards include a center board traversing a center of the opening, and a plurality of side boards each arranged with a predetermined spacing from the center board, and the center board is set to be highest in height, whereas the plurality of side boards are set to be lower in height as the side boards are located further away from the center board.

According to the construction of this preferred embodiment, the plurality of boards include the center board and the plurality of side boards, the center board being highest in height and the side boards being lower in height as the side boards are located further away from the center board. Therefore, sound having passed through the opening can be more easily diffused from the center board toward the side boards.

In a second aspect of the present invention, there is provided a speaker unit including the diffuser, including a baffle board that is formed into a plate shape having a predetermined thickness, and includes a sound emission hole having approximately the same shape and size as the edge reflection portion of the diffuser and extending through the baffle board, the diffuser that is mounted to the baffle board from a rear surface side of the baffle board, and has the center reflection portion disposed inside the sound emission hole, and a speaker mounted to a rear surface side of the diffuser, wherein the diffuser is mounted to the baffle board such that the edge reflection portion is fitted in the sound emission hole of the baffle board.

According to the construction of the second aspect of the present invention, the diffuser is mounted to the baffle board having the sound emission hole from the rear surface side thereof, and the center reflection portion of the diffuser is disposed inside the sound emission hole of the baffle board. Further, the speaker is mounted to the rear surface side of the diffuser. In the speaker unit including the baffle board, the diffuser, and the speaker, the diffuser is mounted to the baffle board such that the edge reflection portion of the diffuser is fitted in the sound emission hole of the baffle board. Out of sound emitted from the speaker and reflected from the center reflection portion of the diffuser, part which has proceeded toward a peripheral edge of the sound emission hole of the baffle board is further reflected on the edge reflection portion of the diffuser. As described above, the sound reflected from the edge reflection portion is widely diffused through space ranging from forward of the diffuser to the side opposite to reflecting portions with respect to the axis passing through the center of the diffuser, thus being increased in the degree of diffusion thereof. This makes it possible to obtain the speaker unit which is capable of evenly and widely diffusing sound emitted from the speaker, thereby obtaining excellent acoustic radiation characteristics.

Preferably, the diffuser is mounted to the baffle board in a state in which the base portion is in contact with a rear surface of the baffle board, and a front surface of the center reflection portion is set to be located at approximately the same position as a front surface of the baffle board.

According to the construction of this preferred embodiment, since the diffuser is mounted to the baffle board in the state in which the base portion of the diffuser is in contact with the rear surface of the baffle board, it is possible to stably mount the diffuser to the baffle board. Further, since the front surface of the center reflection portion of the diffuser is set to be located at approximately the same position as the front surface of the baffle board, the diffuser is prevented from largely protruding forward from the baffle board, whereby it is possible to obtain a speaker unit which is neat in design, with a flat front surface of a baffle board.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a speaker unit according to a first embodiment of the present invention, in which FIG. 1A shows a state viewed obliquely from above, and FIG. 1B shows a state viewed obliquely from below;

FIGS. 3A to 3C are exploded perspective views of the speaker unit, in which FIG. 3A shows a baffle board, FIG. 3B shows a diffuser, and FIG. 3C shows a speaker;

FIGS. 4A to 4C are exploded cross-sectional views corresponding to FIG. 2B, in which FIG. 4A shows the baffle board, FIG. 4B shows the diffuser, and FIG. 4C shows the speaker;

FIGS. 5A to 5C are exploded cross-sectional views corresponding to FIG. 2C, in which FIG. 5A shows the baffle board, FIG. 5B shows the diffuser, and FIG. 5C shows the speaker;

FIGS. 6A and 6B are diagrams showing results of simulation of acoustic radiation characteristics of sound waves emitted from the speaker unit, performed on a right half of the speaker unit, in which FIG. 6A shows acoustic radiation characteristics corresponding to a major diameter of the speaker and FIG. 6B shows acoustic radiation characteristics corresponding to a minor diameter of the speaker;

FIGS. 7A and 7B are views of a diffuser according to a second embodiment of the present invention, in which FIG. 7A is a plan view and FIG. 7B is a cross-sectional view taken along line b-b in FIG. 7A;

FIGS. 8A and 8B are views of a diffuser according to a third embodiment of the present invention, in which FIG. 8A is a plan view and FIG. 8B is a cross-sectional view taken along line b-b in FIG. 8A; and FIGS. 9A and 9B are graphs of acoustic radiation characteristics, each with the horizontal axis representing frequency and the vertical axis representing sound pressure, in which FIG. 9A shows acoustic radiation characteristics of a speaker unit including the diffuser according to the second embodiment, and FIG. 9B shows acoustic radiation characteristics of a speaker unit including the diffuser according to the third embodiment.

DETAILED DESCRIPTION OF PREFERRED EMBODIMENTS

Figure 1A:
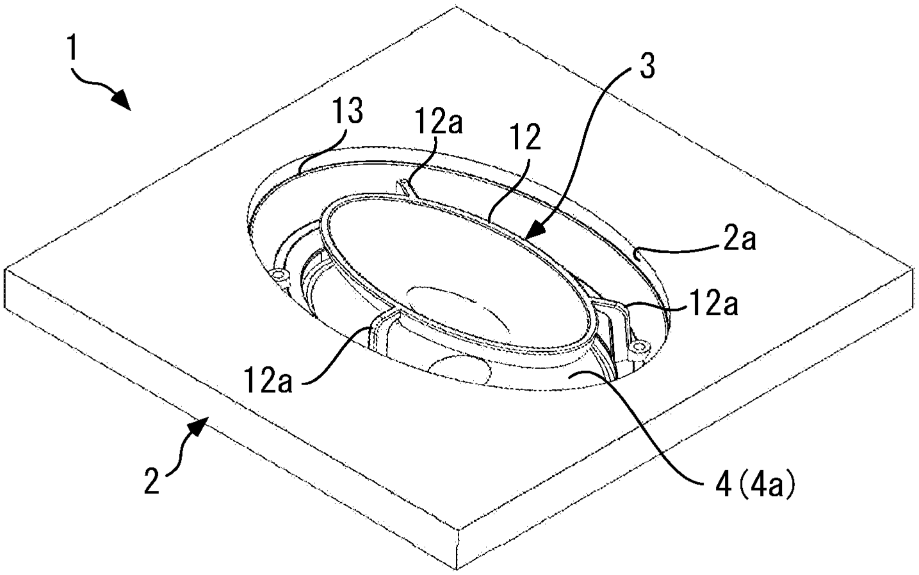
Figure 1B:
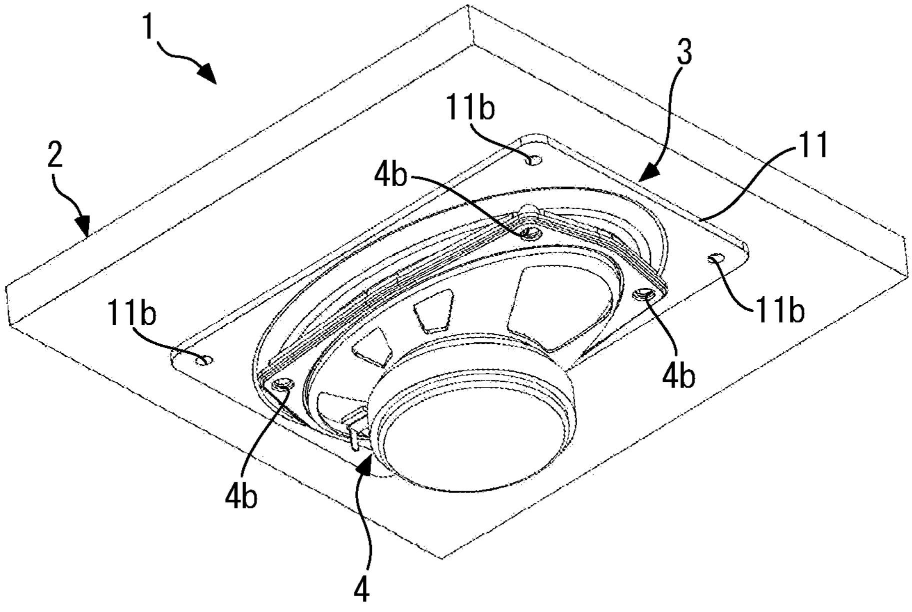

The present invention will now be described in detail with reference to the drawings showing preferred embodiments thereof. FIGS. 1A and 1B shows a speaker unit equipped with a diffuser according to a first embodiment of the present invention. FIG. 1A shows a state viewed obliquely from above, and FIG. 1B shows a state viewed obliquely from below. Note that this speaker unit 1 is applied, for example, to an electronic piano and is incorporated at about a keyboard of the electronic piano in a state facing upward.

Figure 2A:
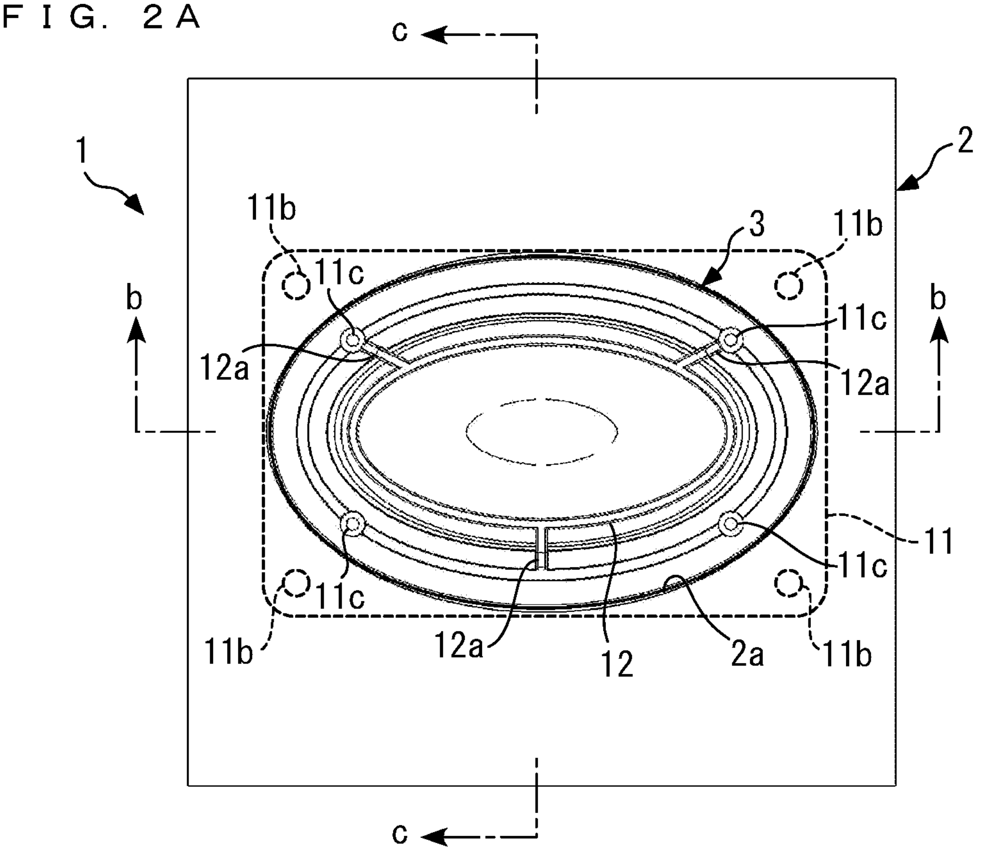
FIG. 2A is a plan view of the speaker unit.
Figure 2B:
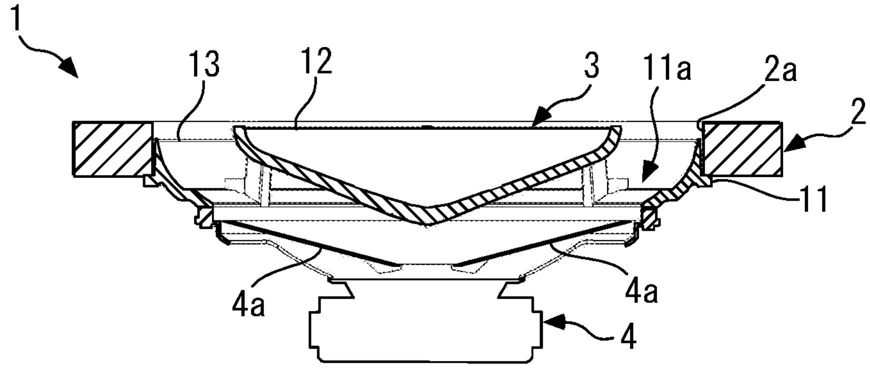
FIG. 2B is a cross-sectional view taken along line b-b in FIG. 2A.
Figure 2C:
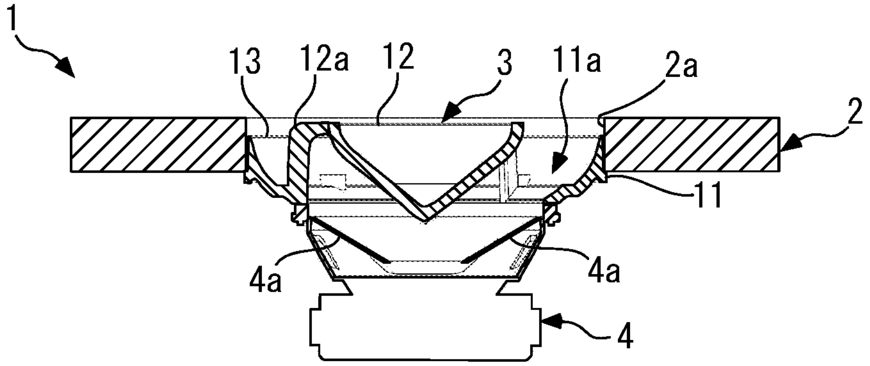
FIG. 2C is a cross-sectional view taken along line c-c in FIG. 2A.
Figure 3A:
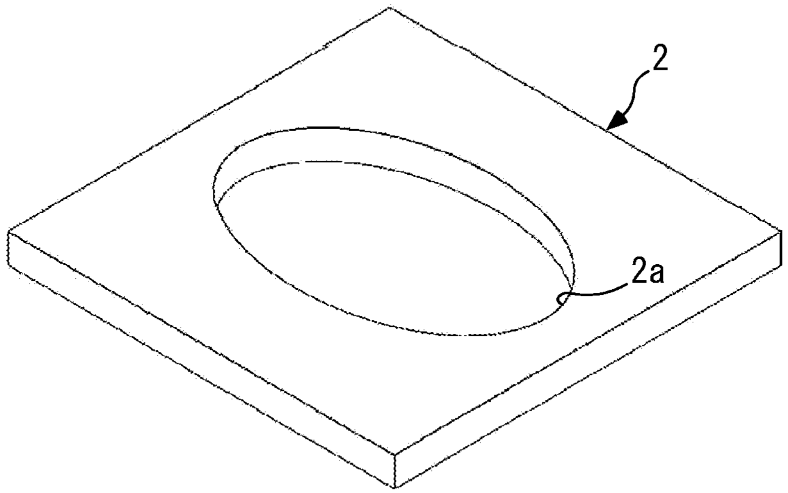
Figure 3B:
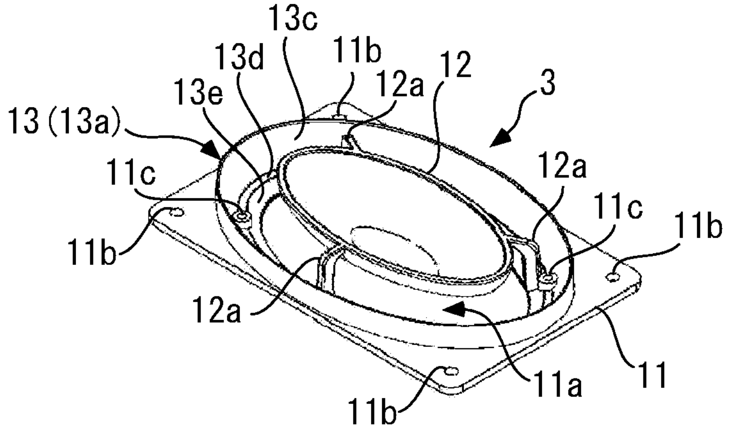
Figure 3C:
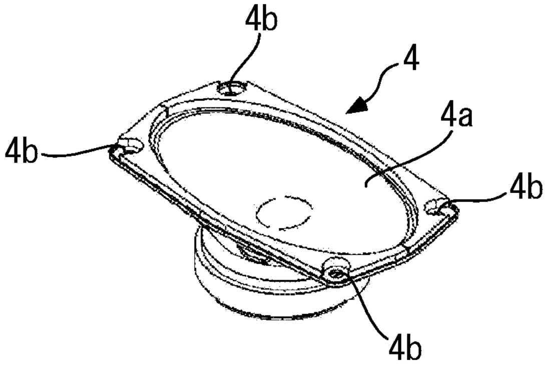
Figure 4A:
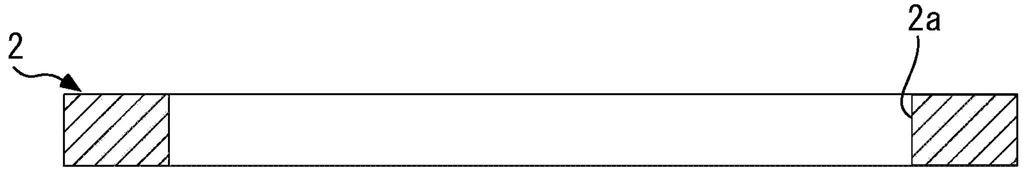
Figure 4B:
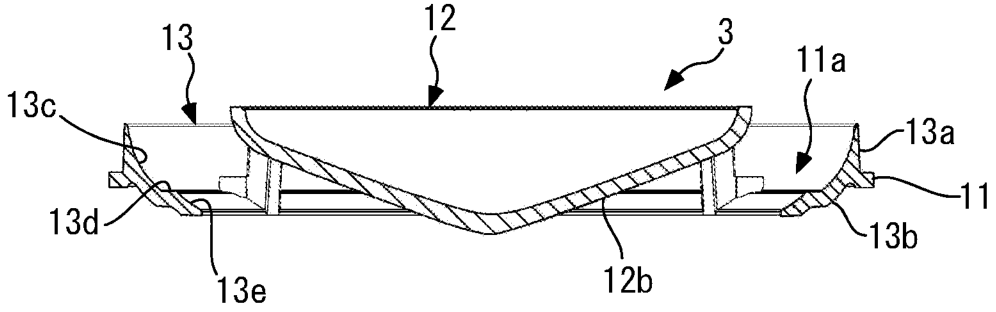
Figure 4C:
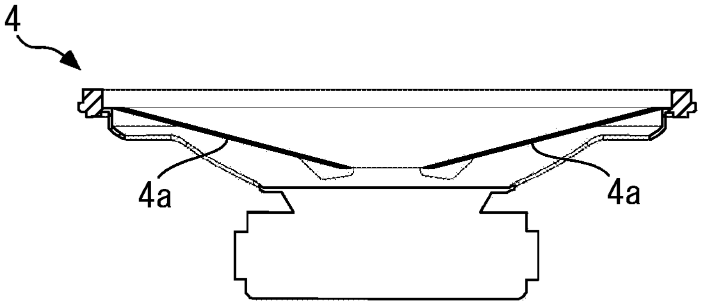

FIG. 2A is a plan view of the speaker unit 1, and FIG. 2B and FIG. 2C are cross-sectional views taken along line b-b and line c-c in FIG. 2A, respectively. Further, FIGS. 3A to 3C are exploded perspective views of the speaker unit 1. FIGS. 4A to 4C are exploded cross-sectional views corresponding to FIG. 2B, and FIGS. 5A to 5C are exploded cross-sectional views corresponding to FIG. 2C. As shown in FIGS. 1A and 1B to FIGS. 5A to 5C, the speaker unit 1 is comprised of a baffle board 2, a diffuser 3, and a speaker 4.

The baffle board 2 is a plate-like member having a predetermined thickness and has a rectangular shape in plan view. Further, the baffle board 2 has a central portion thereof formed with a sound emission hole 2*a* which has an elliptic shape with a predetermined size in plan view and extends through the baffle board 2.

The diffuser 3 is made, for example, of a synthetic resin, and is formed into a predetermined shape. Specifically, as shown in FIG. 3B, the diffuser 3 is comprised of a plate-like base portion 11 which has a laterally elongated rectangular shape in plan view and has a relatively large through hole 11*a* formed in a central portion thereof, a center reflection portion 12 formed into a predetermined size smaller than the through hole 11*a*, and an edge reflection portion 13 protruding upward and downward of the base portion 11 from a peripheral edge of the through hole 11*a* of the base portion 11.

As shown in FIGS. 1A and 1B to FIGS. 3A to 3C, the base portion 11 has four corners thereof formed with mounting holes 11*b*, respectively, which vertically extend through the base portion 11 for screwing the diffuser 3 to the baffle board 2. Further, the base portion 11 has a plurality of (four in the present embodiment) screw holes 11*c* formed inside the edge reflection portion 13, for screwing the speaker 4 to the inside of the edge reflection portion 13.

The center reflection portion 12 has an elliptic shape with a predetermined size in plan view and is formed into a hollow shape open upward and a cone shape protruding downward. Further, the center reflection portion 12 is supported by a plurality of (three in the present embodiment) connecting portions 12*a* erected from the peripheral edge of the through hole 11*a* of the base portion 11 such that the center reflection portion 12 is located in the center of the through hole 11*a*.

Figure 5A:
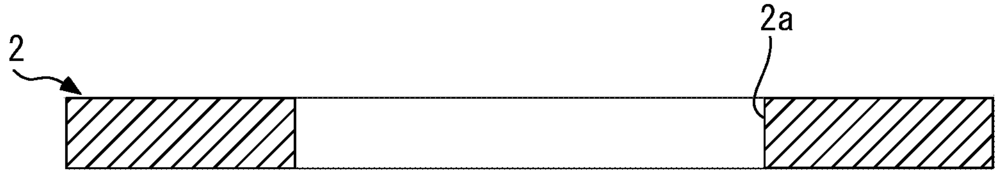
Figure 5B:
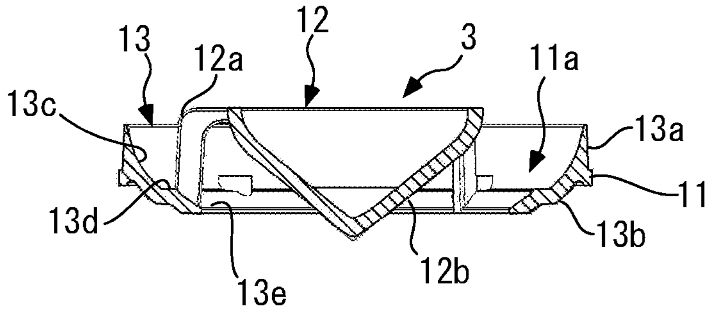
Figure 5C:
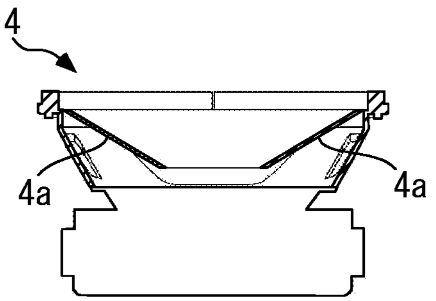

As shown in FIGS. 3B, 4B and 5B, the edge reflection portion 13 includes an upper protrusion 13*a* and a lower protrusion 13*b* which protrude from an upper surface and a lower surface of the base portion 11, respectively. Further, the edge reflection portion 13 has an inner surface including an upper arcuate surface 13*c* formed into an arcuate shape with a predetermined curvature, a flat surface 13*d* continuous with a lower end of the upper arcuate surface 13*c* and slightly inclined inward, and a lower arcuate surface 13*e* continuous with an inner end of the flat surface 13*d* and formed into an arcuate shape with a smaller curvature than the upper arcuate surface 13*c*.

The speaker 4 includes a cone-shaped diaphragm 4*a*, and the diaphragm 4*a* is formed into an elliptic shape with a predetermined major diameter and a predetermined minor diameter in plan view. Further, the speaker 4 has four mounting holes 4*b* formed at four corners thereof, respectively.

In the speaker unit 1 including the baffle board 2, the diffuser 3, and the speaker 4, which are constructed as described above, the diffuser 3 is mounted to the baffle board 2 from a lower surface side of the baffle board 2, and the speaker 4 is mounted to the diffuser 3 from a lower surface side of the diffuser 3. The diffuser 3 and the speaker 4 are screwed to the baffle board 2 and the diffuser 3, via the mounting holes 11*b* and the mounting holes 4*b*, respectively. In this case, the diffuser 3 is mounted to the baffle board 2 in a state in which the base portion 11 of the diffuser 3 is in contact with the lower surface side of the baffle board 2 and in a state in which the upper protrusion 13*a* of the edge reflection portion 13 is fitted in the sound emission hole 2*a* of the baffle board 2. With this, the edge reflection portion 13 of the diffuser 3 is located inside the edge of the sound emission hole 2*a* of the baffle board 2, and the upper arcuate surface 13*c*, the flat surface 13*d*, and the lower arcuate surface 13*e*, which form the inner surface of the edge reflection portion 13, are opposed to a reflection surface 12*b* of the center reflection portion 12 with a predetermined spacing therebetween.

Further, in this case, as shown in FIGS. 2B and 2C, an upper surface of the center reflection portion 12 of the diffuser 3 is set to be located at approximately the same position as an upper surface of the baffle board 2.

Figure 6A:
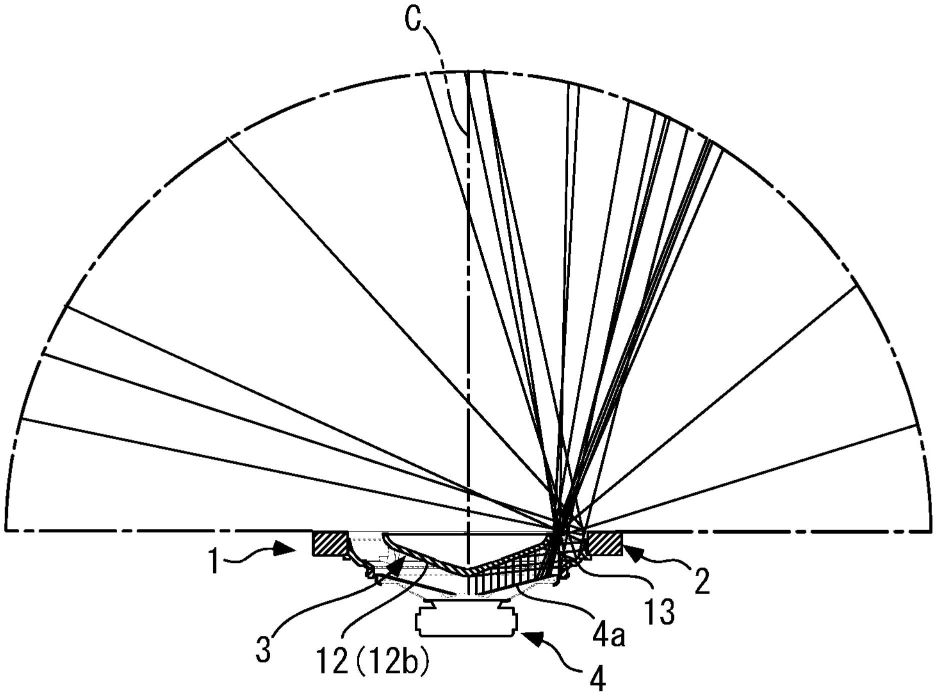
Figure 6B:
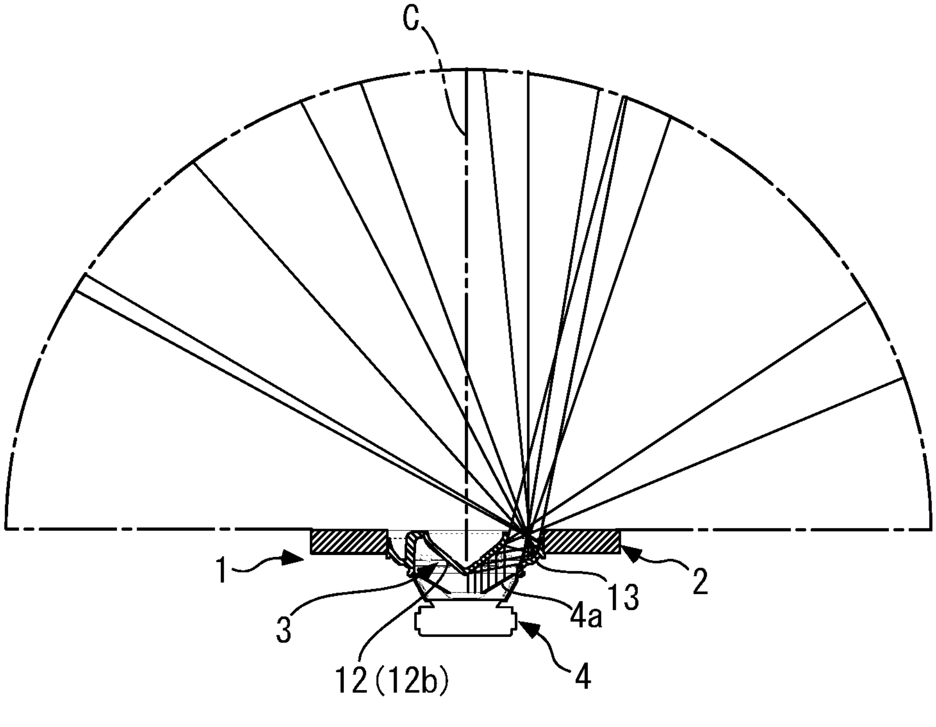

FIGS. 6A and 6B are diagrams showing results of simulation of acoustic radiation characteristics of sound waves emitted from the speaker unit, performed on a right half of the speaker unit. FIG. 6A corresponds to a major diameter of the speaker and FIG. 6B corresponds to a minor diameter of the speaker 4. As shown in FIGS. 6A and 6*b*, when the sound waves are emitted from the diaphragm 4*a* of the speaker 4 toward forward of the front thereof (upward as viewed in FIGS. 6A and 6B), most of the sound waves are reflected on the reflection surface 12*b* of the center reflection portion 12 of the diffuser 3 and proceed radially in a radial direction of the center reflection portion 12. In this case, some of the sound waves, which have proceeded toward the edge of the sound emission hole 2*a* of the baffle board 2, are further reflected on the upper arcuate surface 13*c* and the lower arcuate surface 13*e*, which form the inner surface of the edge reflection portion 13 of the diffuser 3. The sound waves reflected on the upper arcuate surface 13*c* and the lower arcuate surface 13*e* are widely diffused through space ranging from forward (upward as viewed in FIGS. 6A and 6B) of the diffuser 3 to a side opposite to reflecting portions with respect to an axis C passing through the center of the diffuser 3, thus being increased in the degree of diffusion thereof.

Note that although FIGS. 6A and 6B show only the results of simulation of reflection of sound waves, performed on right halves of the center reflection portion 12 and the edge reflection portion 13 of the diffuser 3, results of simulation of reflection of sound waves on left halves of the center reflection portion 12 and the edge reflection portion 13 are symmetrical to the simulation results shown in FIGS. 6A and 6B.

As described hereinabove, according to the speaker unit 1 including the diffuser 3 of the present embodiment, sound emitted from the speaker 4 can be evenly and widely diffused, whereby it is possible to obtain excellent acoustic radiation characteristics.

Figure 7A:
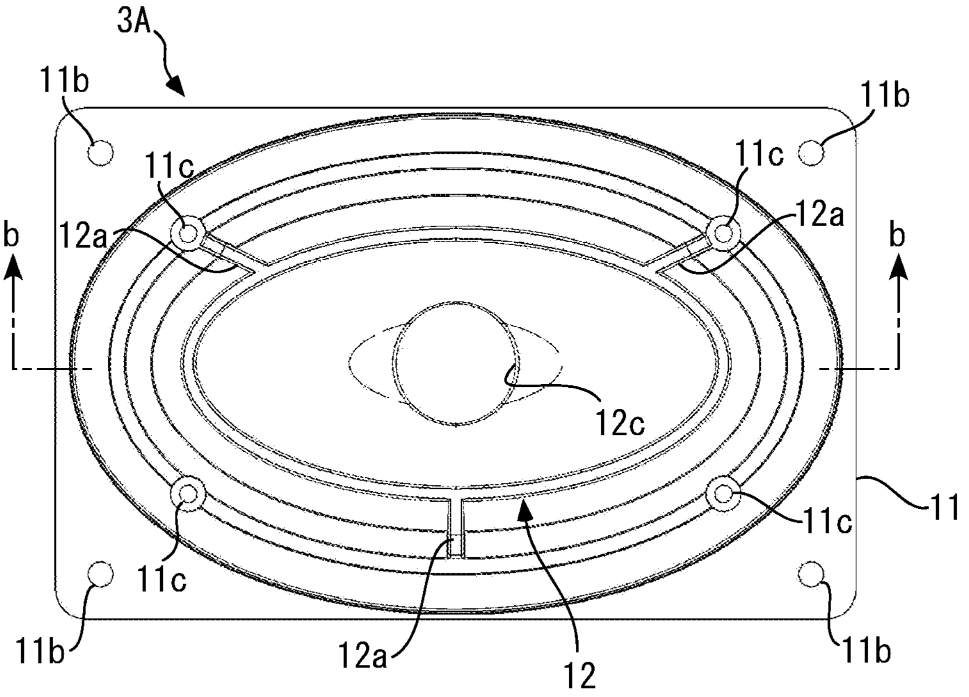
Figure 7B:
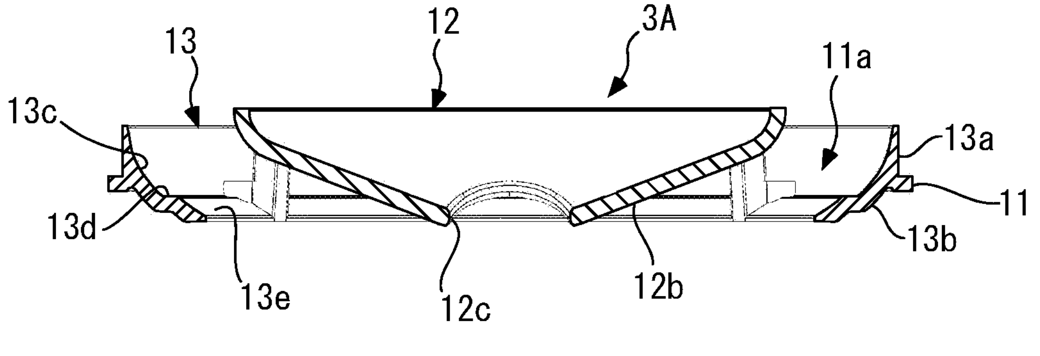

FIGS. 7A and 7B show a diffuser according to a second embodiment of the present invention. As shown in FIGS. 7A and 7B, this diffuser 3A is different from the above-described diffuser 3 of the first embodiment only in that the diffuser 3A has a through opening 12*c* in a central portion of the center reflection portion 12. Note that in the following description, the components of the diffuser 3A having the same configurations as those of the diffuser 3 of the first embodiment are denoted by the same reference numerals and detailed description thereof will be omitted.

As shown in FIGS. 7A and 7B, the opening 12*c*, which is circular in plan view and has a predetermined diameter, is formed in the center of the center reflection portion 12 of the diffuser 3A.

In the above-described diffuser 3 of the first embodiment, sound waves emitted from about a central portion of the diaphragm 4*a* of the speaker 4 are reflected on the center reflection portion 12, and hence sound pressure is sometimes reduced. In contrast, in the diffuser 3A of the present embodiment, since the opening 12*c* is formed in the center of the center reflection portion 12, sound waves emitted from about the central portion of the diaphragm 4*a* of the speaker 4 are directly emitted upward of the diffuser 3 via the opening 12*c*, whereby reduction of sound pressure is suppressed, so that it is possible to obtain excellent acoustic radiation characteristics as a whole.

Figure 8A:
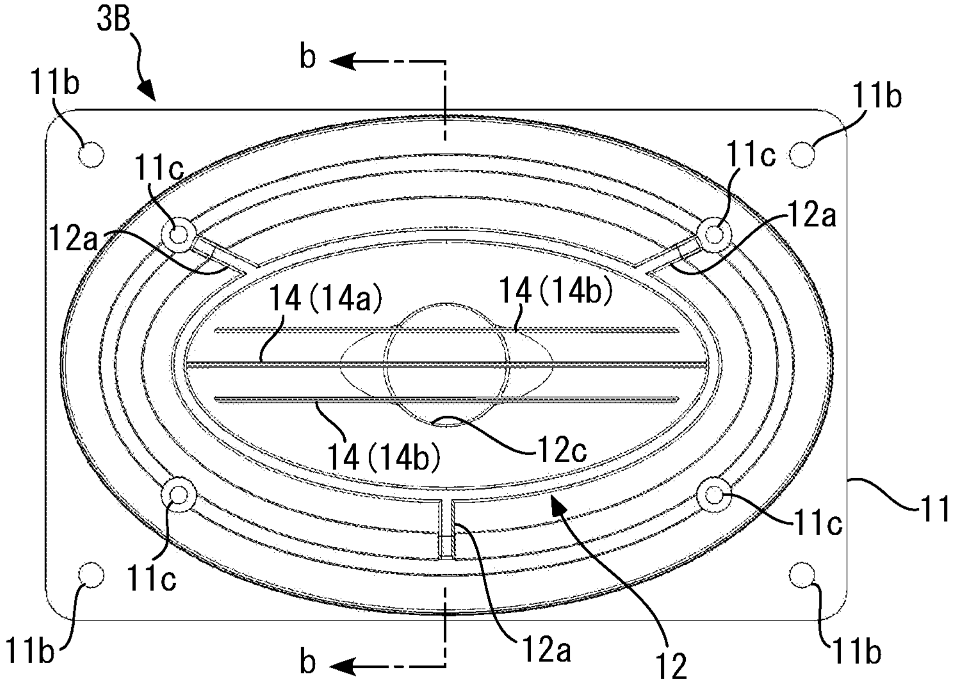
Figure 8B:
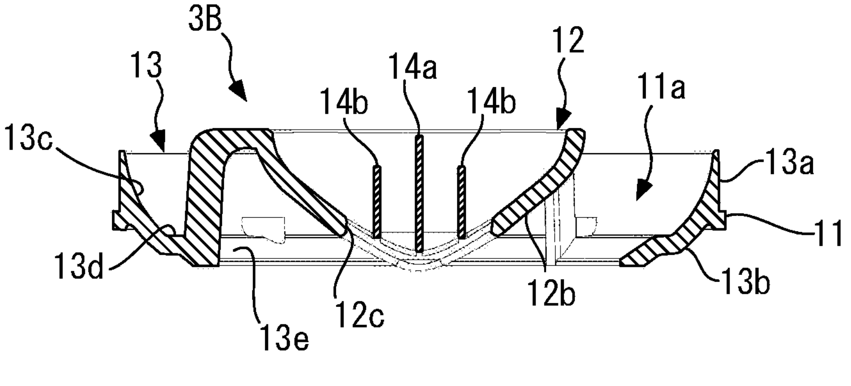

FIGS. 8A and 8B show a diffuser according to a third embodiment of the present invention. As shown in FIGS. 8A and 8B, this diffuser 3B is different from the above-described diffuser 3A of the second embodiment only in that the diffuser 3B has a plurality of (three in the present embodiment) thin plate-like boards 14 inside the center reflection portion 12. Note that in the following description, the components of the diffuser 3B having the same configurations as those of the diffusers 3 and 3A of the first and second embodiments are denoted by the same reference numerals and detailed description thereof will be omitted.

As shown in FIGS. 8A and 8B, on an inner surface of the center reflection portion 12 of the diffuser 3B, the three boards 14 are provided which extend along a direction of a major diameter of the center reflection portion 12 and are arranged parallel to each other with a predetermined spacing therebetween. Specifically, as shown in FIG. 8A, each of the boards 14 extends such that it traverses the opening 12*c* of the center reflection portion 12. Further, as shown in FIG. 8B, out of the three boards 14, a center board 14*a*, which traverses the center of the opening 12*c*, is higher in height (height upward as viewed in FIG. 8B) than the other two side boards 14*b* and 14*b*.

Figure 9A:
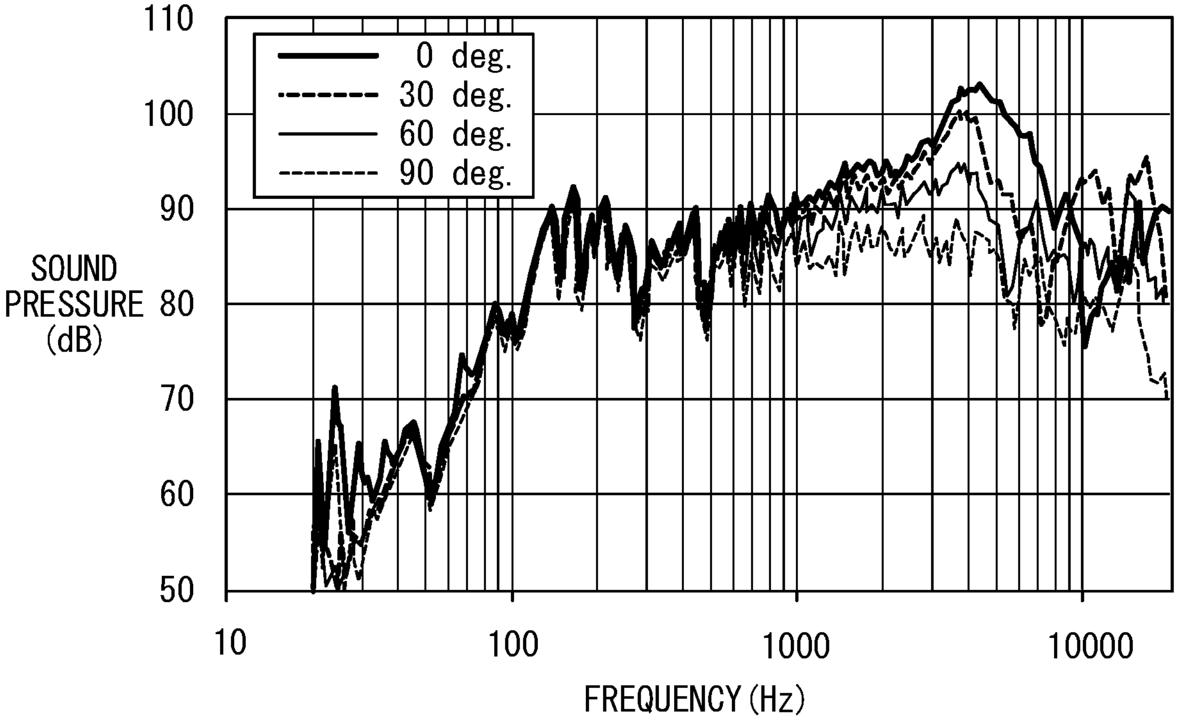
Figure 9B:
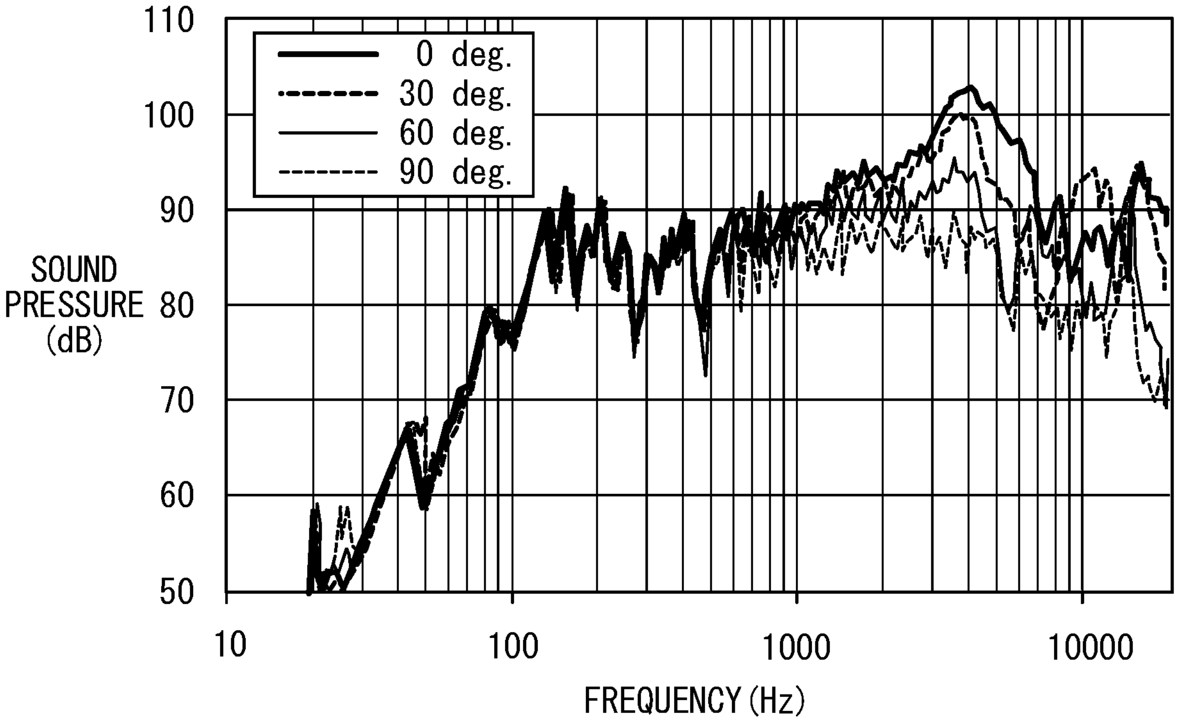

FIGS. 9A and 9B show experimental results of acoustic radiation characteristics in respective speaker units including the diffuser 3A according to the second embodiment and the diffuser 3B according to the third embodiment. Specifically, in each graph, the horizontal axis represents frequency and the vertical axis represents sound pressure, and line types different from each other show, assuming that a central axis passing through the center of the center reflection portion 12 of the diffusers 3A and 3B is set to 0 degrees (deg.) and the point of intersection between the central axis and a front surface of each speaker unit is set as a center, acoustic radiation characteristics at respective predetermined angles with respect to the central axis.

As shown in FIG. 9A, in the diffuser 3A according to the second embodiment, i.e., in the diffuser 3A having the opening 12*c* formed in the center of the center reflection portion 12, there occurred a so-called peak dip, i.e. a phenomenon in which the sound pressure of sound waves emitted along the central axis is reduced at about 10000 Hz. On the other hand, as shown in FIG. 9B, in the diffuser 3B according to the third embodiment, i.e., in the diffuser 3B in which, on the center reflection portion 12 including the opening 12*c*, the plurality of boards 14 traversing the opening 12*c* are provided, differently from the above-described diffuser 3A according to the second embodiment, it was confirmed that it is possible to suppress the peak dip.

Note that the present invention is not limited to the above-described embodiment, but it can be practiced in various forms. For example, although in the diffusers 3, 3A and 3B, the center reflection portion 12 and the edge reflection portion 13 are each formed into an elliptic shape in plan view, the present invention is not limited to this, but in a case where the diaphragm of the speaker is circular in plan view, the center reflection portion 12 and the edge reflection portion 13 can be formed into a circular shape in accordance with the circular diaphragm. Further, although in the above-described embodiments, the center reflection portion 12 is formed into the cone shape protruding downward, the present invention is not limited to this, but it is also possible to employ any other suitable shape for the center reflection portion 12 insofar as the center reflection portion 12 can reflect sound waves emitted from the speaker 4, toward the edge reflection portion 13.

Further, although in the above-described embodiments, the center reflection portion 12 is formed to have a smaller size than the through hole 11*a* of the base portion 11, the present invention is not limited to this, but the center reflection portion 12 can also be formed to have the same size as or a larger size than the through hole 11*a* insofar as it is possible to secure excellent acoustic radiation characteristics. Furthermore, although in the above-described embodiments, the edge reflection portion 13 is formed to have the upper protrusion 13*a* and the lower protrusion 13*b* which protrude from the upper surface and the lower surface of the base portion 11, respectively, the present invention is not limited to this, but the edge reflection portion 13 can also be formed to protrude from only one of the upper and lower surfaces of the base portion 11.

Further, although in the diffuser 3A of the second embodiment, the opening 12*c* is formed in the center of the center reflection portion 12, the shape and size of the opening 12*c* are not specifically limited, but it is also possible to form a plurality of openings 12*c* or form the opening 12*c* in a slit-like shape in plan view.

Furthermore, although in the diffuser 3B of the third embodiment, the three boards 14 extending along the direction of the major diameter of the center reflection portion 12 are provided inside the center reflection portion 12, the extension direction and the number of the boards 14 are not specifically limited. For example, the boards can be formed such that they extend in a direction of the minor diameter of the center reflection portion 12, or two or four or more boards can be provided.

Further, although in the above-described embodiments, as the center reflection portion 12 of each of the diffusers 3, 3A and 3B, there is employed one which is formed into the hollow shape open upward, the present invention is not limited to this, but there can be employed, as the center reflection portion 12 for the diffusers 3 and 3A of the first and second embodiments, for example, one which has a solid shape. Further, details of the constructions of the diffusers 3, 3A and 3B, and the speaker unit 1 shown in the embodiments are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A diffuser disposed forward of a diaphragm of a speaker, for reflecting sound emitted from the speaker and thereby diffusing the sound, comprising:

a base portion that is formed into a plate shape having a predetermined planar shape in plan view, and includes a through hole having approximately the same shape and size as the diaphragm of the speaker;

a center reflection portion that is formed into a predetermined size corresponding to the through hole and is supported by the base portion; and an edge reflection portion that is formed into an arcuate shape protruding at least either forward or rearward of the base portion from a peripheral edge of the through hole of the base portion and having a recessed inner surface, for further reflecting sound reflected from the center reflection portion.

2. The diffuser according to claim 1, wherein the center reflection portion is formed into a hollow shape open forward of the base portion and has an opening in a central portion thereof, which extends through the center reflection portion and has a predetermined diameter.

3. The diffuser according to claim 2, wherein the center reflection portion further includes a plurality of boards which each have a predetermined height protruding forward of the base portion and extend parallel to each other such that each traverses the opening.

4. The diffuser according to claim 3, wherein the plurality of boards include:

a center board traversing a center of the opening, and a plurality of side boards each arranged with a predetermined spacing from the center board, wherein the center board is set to be highest in height, and wherein the plurality of side boards are set to be lower in height as the side boards are located further away from the center board.

5. A speaker unit including the diffuser according to claim 1, comprising:

a baffle board that is formed into a plate shape having a predetermined thickness, and includes a sound emission hole having approximately the same shape and size as the edge reflection portion of the diffuser and extending through the baffle board;

the diffuser that is mounted to the baffle board from a rear surface side of the baffle board, and has the center reflection portion disposed inside the sound emission hole; and a speaker mounted to a rear surface side of the diffuser, wherein the diffuser is mounted to the baffle board such that the edge reflection portion is fitted in the sound emission hole of the baffle board.

6. The speaker unit according to claim 5, wherein the diffuser is mounted to the baffle board in a state in which the base portion is in contact with a rear surface of the baffle board, and a front surface of the center reflection portion is set to be located at approximately the same position as a front surface of the baffle board.

* * * * *